United States Patent Office 2,836,214
Patented May 27, 1958

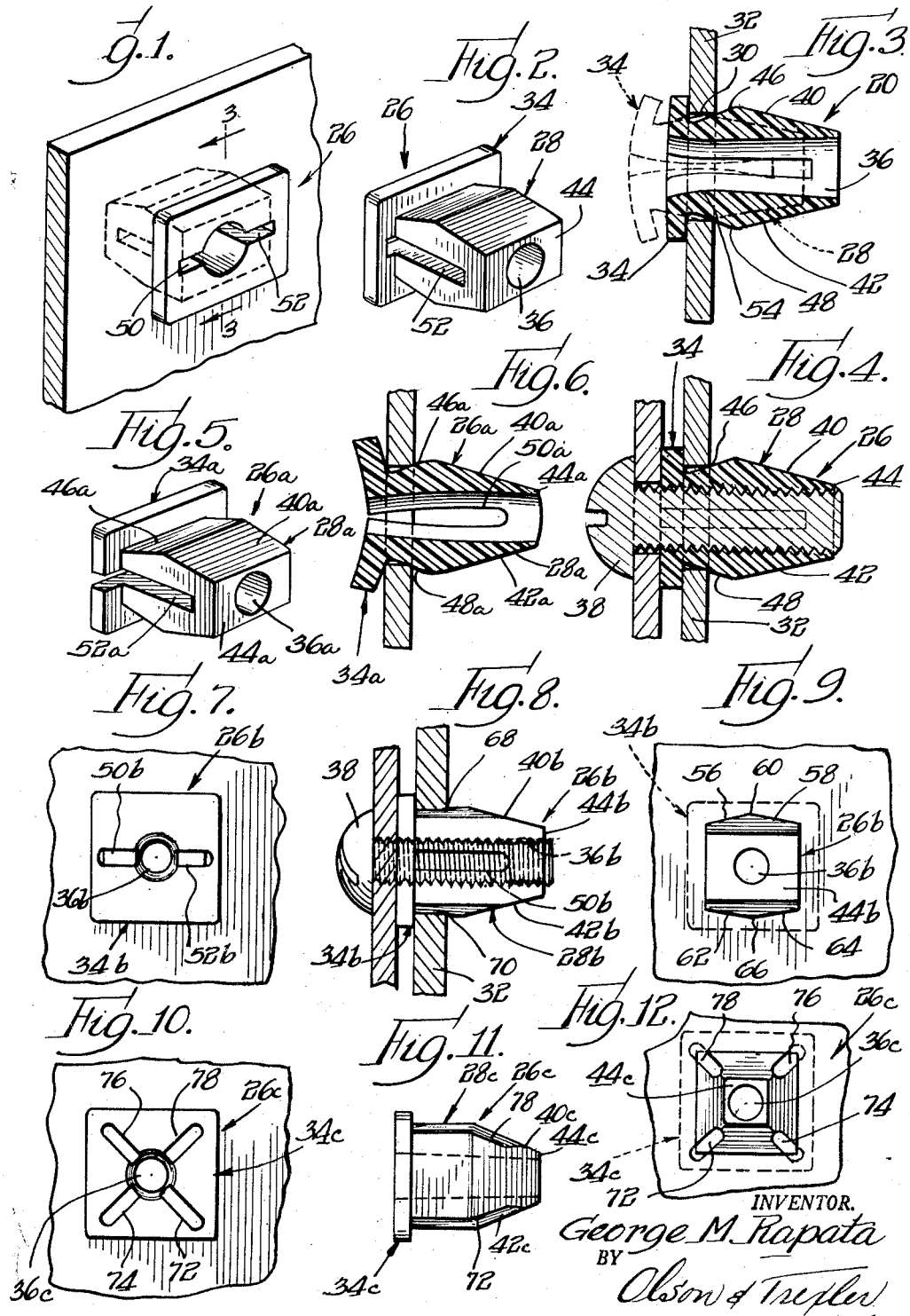

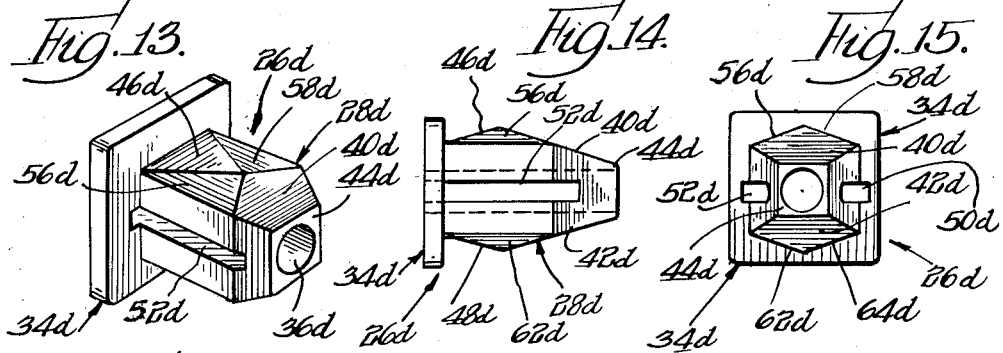
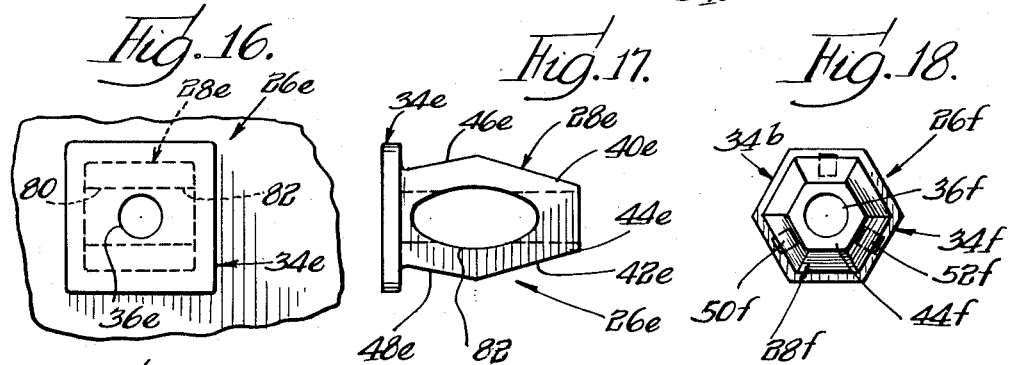
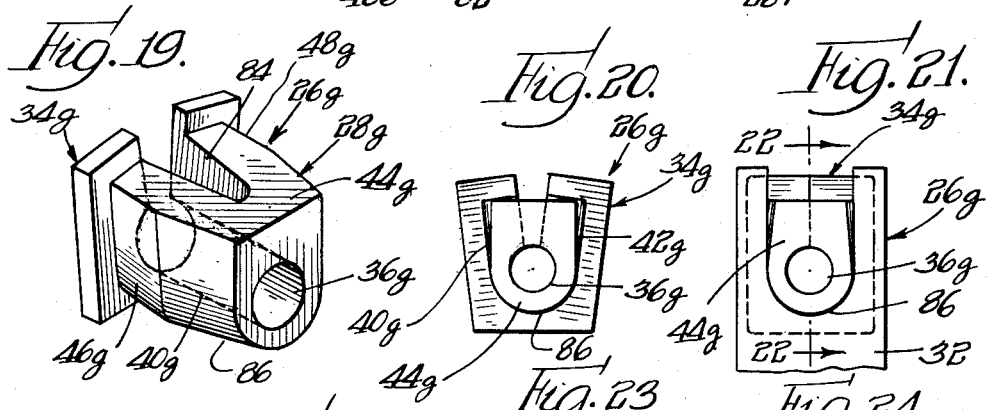
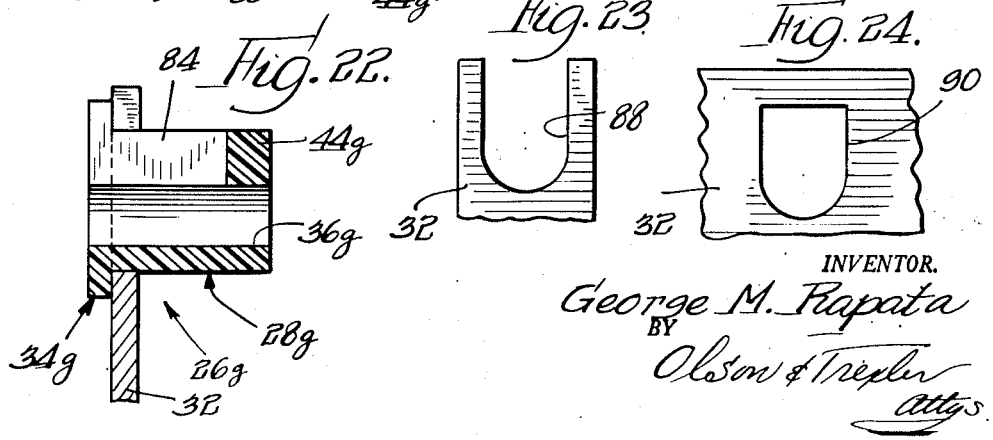

2,836,214

PLASTIC SCREW ANCHOR WITH SLOTTED HEAD

George M. Rapata, Chicago, Ill., assignor to Illinois Tool Works, Chicago, Ill., a corporation of Illinois Application July 31, 1953, Serial No. 371,613

3 Claims. (Cl. 151—41.75)

The present invention relates to novel anchor members, and more particularly to novel anchor members of the type adapted to be inserted in an apertured work panel and receive a threaded fastener, such as a screw.

Anchor members of the above described general type have been formed so that the anchor may be inserted into an apertured work piece and then expanded by the application thereto of a threaded screw member or the like so that the anchor member is securely fastened to the panel or work piece. Such anchors are often made from a plastic material, and when so made, enable the screw member to be inserted without prior threading of the anchor. They are especially useful in electrical installations where the screw member must be insulated from the work piece and for mounting screw members in materials, such as porcelain or glass, which materials are in many instances unsatisfactory for receiving a screw member. The prior art anchor members have generally been provided with a flexible shank portion insertable into a tightly fitting work piece aperture, which shanks are expanded when a screw member is threaded thereinto. In many instances, the shanks of the prior art devices are too flexible, whereby only partial threads are formed in the anchor member upon application of a screw element so that the full holding power of the anchor member is not utilized. In other cases, prior art anchor members have been provided with shanks which are too rigid, thereby making application of the anchor members to the apertured work piece relatively difficult. It is, therefore, a primary object of the present invention to overcome these disadvantages of prior art structures by providing a novel anchor member which may be relatively easily inserted in an apertured work piece while at the same time being constructed so as to assure the formation of substantially full depth threads throughout its entire length.

Another object of the present invention is to provide a novel anchor member of the above described general type which is constructed so as to provide secure engagement with both a work piece and an applied screw member, whereby the screw member is retained against inadvertent disassembly from the work piece.

Another object of the present invention is to provide a novel anchor member of the above described type which may be readily driven into an apertured work piece without danger of breaking flexible portions of the anchor shank section.

Still another object of the present invention is to provide a novel anchor member of the above described type having a plurality of flexible shank sections insertable into an apertured work piece, which novel anchor member is constructed so as to prevent misalignment of the shank sections during application to the work piece and to eliminate loose or sharp edges, thereby substantially reducing any possibility of injury either to the anchor member or a person working around the assembled anchor member due to snagging such loose or sharp edges prevalent in prior art structures.

Other objects and advantages of the present invention will become apparent from the following description and the accompanying drawings, wherein:

Fig. 1 is a perspective view showing a novel anchor member of this invention mounted in an apertured work piece;

Fig. 2 is another perspective view of the anchor member shown in Fig. 1;

Fig. 3 is a cross sectional view taken along line 3—3 in Fig. 1;

Fig. 4 is a cross sectional view similar to Fig. 3, and in addition shows a screw member applied to the anchor member;

Fig. 5 is a perspective view showing an anchor member embodying a slightly modified form of the present invention;

Fig. 6 is a vertical cross sectional view of the anchor member shown in Fig. 5 with the anchor member applied to a work piece;

Figs. 7, 8, and 9 are, respectively, one end view, a side elevational view, and an opposite end view of another modified form of the anchor member of this invention;

Figs. 10, 11, and 12 are, respectively, one end view, a side elevational view, and an opposite end view of another modified form of the anchor member of this invention;

Figs. 13, 14, and 15 are, respectively, a perspective view, a side elevational view, and an end view of another modified form of the anchor member embodying the principles of this invention;

Figs. 16 and 17 are, respectively, an end view and a side elevational view of another anchor member embodying a modified form of this invention;

Fig. 18 is an end view of an anchor member, hexagonal in shape, but otherwise similar to the embodiment shown in Figs. 1 through 4;

Figs. 19 and 20 are, respectively, a perspective view and an end view of still another modified form of the present invention;

Fig. 21 is an end view showing the anchor member of Fig. 19 applied to an apertured work piece;

Fig. 22 is a cross sectional view taken along line 22—22 in Fig. 21; and

Figs. 23 and 24 show various apertured work pieces adapted to receive the anchor member of Fig. 19.

Referring now more specifically to the drawings, wherein like parts are designated by the same numerals throughout the various figures, an anchor member 26 embodying one form of the present invention is shown in Figs. 1 through 4. The anchor member 26 is preferably made from molded plastic material, but, if desired, various other materials may be used.

The anchor member 26 includes a shank section 28 adapted to be inserted into an aperture 30 in a work piece or panel 32. Integral with one end of the shank section is a head section 34 which is adapted to overlie an outwardly facing surface of the work piece to prevent the anchor member from passing entirely through the aperture. The head section is preferably non-circular in outline whereby it may engage a flange or member (not shown) fixed with respect to panel 32 to prevent the anchor member from rotating relative to the panel. This is especially useful whenever it is desired to make either the aperture 30 in the panel of the shank of the anchor circular in outline. A bore 36 extends through the head and shank sections for receiving a threaded member such as a screw 38 in the manner illustrated in Fig. 4. The internal surfaces of the anchor member defining the bore 36 are preferably initially smooth so that upon the application of the screw element to the anchor member complementary threads are cut into the anchor member by the screw.

As shown best in Figs. 2, 3, and 4, opposite side portions 40 and 42 of the shank section 28 diverge with respect to each other from the free or entering end 44 of the shank toward the head section. These diverging side or surface portions then merge with converging surface portions 46 and 48, respectively, whereby the surface portions 46 and 48 provide shoulders or abutment means engageable with an inwardly facing surface of the work piece to retain the anchor member in assembled relationship with the work piece. As illustrated in Figs. 3 and 4, the width of the aperture 30 in the work piece is less than the greatest thickness of the shank section so that as the relatively narrow entering end of the shank section is inserted into the aperture, the shank must be partially collapsed to allow complete insertion. Opposite sides of the shank section 28 are slotted, as at 50 and 52, whereby to provide the shank with sufficient flexibility to allow the shank to collapse and permit relatively easy insertion of the anchor member through the aperture. In accordance with an important feature of the present invention, it should be noted that the slots 50 and 52 terminate short of the entry end 44 of the shank section, whereby during the application of the screw element, the opposite sides of the shank section are retained together to insure the formation of full depth threads in the anchor member. Furthermore, in the embodiment illustrated in Figs. 1 through 4, the slots 50 and 52 extend through the head section 34, as shown best in Fig. 1, whereby to permit flexing of the head section and, therefore, easier collapsing of the shank section during application of the anchor member to the work piece. However, it should be noted that in this embodiment, the slots do not entirely separate opposite sides of the head section, whereby the head section also serves to retain opposite sides of the shank portion together.

The anchor member 26 is applied to the work piece 32 merely by inserting the relatively narrow entering end 44 into the aperture 30 and pressing or driving the anchor member against the work piece. It should be noted that because of the continuous entering portion of the shank, the opposite flexible sides of the shank are held in proper relationship with respect to each other, thereby substantially eliminating any possibility of breaking the shank during application to the work piece. As the anchor member advances to the position shown in broken lines in Fig. 3, it will be noted that the opposite flexible sides of the shank portion collapse together and that this collapsing is facilitated by the slots 50 and 52 which extend for a substantial portion of the shank and through the head section. When the anchor member is fully seated within the aperture, as shown in solid lines in Fig. 3, it should be noted that the surface of the bore 36 remains partially inwardly collapsed, as at 54. Thus, as the screw element 38 is threaded into the bore, the opposite sides of the shank are forced away from each other to bring the abutment surface portions 46 and 48 into secure engagement with the work piece. Furthermore, because of the initial partially collapsed condition of the shank, the screw is tightly gripped and held against inadvertent retrograde movement. As pointed out above, the continuous portion of the shank at the entering end 44 prevents spreading of the end portions of the shank, whereby a screw element forms full depth threads for the entire length of the anchor member so that the anchor provides the maximum holding power, and, in addition, there are no free or sharp edges at the entering end which might snag a person working around the assembled anchor member.

In Figs. 5 and 6, there is shown an anchor member 26a which is substantially identical to the above described anchor member 26, as shown by the identical numerals with the suffix "a" added, except that in this embodiment, the slots 50a and 52a are formed so as to completely sever opposite sides of the head section 34a. With this structure, even greater flexibility is imparted to the anchor member, whereby collapsing of opposite sides of the shank section, and thereby insertion of the anchor member into an apertured work piece, is made relatively easy.

Figs. 7, 8, and 9 show an anchor member 26b which is similar to the above described anchor member 28, as shown by identical numerals with the suffix "b" added applied to corresponding parts. The anchor member 26b differs from the anchor member 26 in that the above described abutment surfaces 46 and 48 have been eliminated. In order to provide for engagement of the anchor member 26b with the inwardly facing surface of the work piece, opposite sides of the shank are provided with transversely inclined surfaces 56 and 58 meeting at a narrow ridge 60, and 62 and 64 meeting at a narrow ridge 66. When the anchor member 26b is inserted into a work piece, the narrow ridges 60 and 66 are forced into engagement with the work piece when the shank is expanded by the screw so that the narrow ridges collapse to form shoulders 68 and 70 engageable with the inwardly facing surfaces of the work piece, as shown in Fig. 8.

Figs. 10, 11, and 12 show an anchor member 26c which is similar to the above described anchor member 26, as shown by the same numerals with the suffix "c" added applied to identical parts. This embodiment differs from anchor member 26 in that the above described slots 50 and 52 have been replaced with similar slots 72, 74, 76, and 78 disposed at each corner of the generally rectangular anchor member and extending diagonally thereof. This arrangement of the slots provides the shank section 28c with four relatively flexible shank sides, which sides are sufficiently flexible to enable them to be expanded and deformed to provide shoulders for engaging the inwardly facing surface of the work piece so that the above described abutment surfaces 46 and 48 have been deleted from the anchor member 26c.

In Figs. 13, 14, and 15, there is shown an anchor member 26d which embodies features of both the above described anchor members 26 and 26b. In this embodiment, opposite sides of the shank section have not only been provided with longitudinally inclined abutment surfaces 46d and 48d, but have also been provided with transversely inclined surfaces 56d, 58d, 62d, and 64d. With this arrangement, it is seen that the amount of material at the abutment surfaces 46d and 48d is relatively small as compared with the amount of material at the abutment surfaces 46 and 48 so that the surfaces 46d and 48d are readily deformable to provide increased engagement with the inwardly facing surface of the work piece.

Figs. 16 and 17 illustrate an anchor member 26e which is substantially identical to the above described anchor member 26, except that the slots 50 and 52 have been replaced by wider generally oval-shaped slots 80 and 82 located entirely within the shank section. With this arrangement, the head section 34e is somewhat stiffer than the above described section 34, but this is offset by the relatively wide and oval-shaped slots which increase the resiliency of the opposite sides of the shank section.

Fig. 18 illustrates an anchor member 26f which is substantially identical to the above described anchor member 26. However, the anchor member 26f is hexagonal in shape and illustrates how the above described generally rectangular anchor member 26 may be modified to fit into special apertures.

Figs. 19 through 22 show an anchor member 26g which is essentially identical to the above described anchor member 26 as shown by the application of identical numerals with the suffix "g" added to similar parts. In this embodiment, a single slot 84 is provided in one side of the anchor member, which slot has sidewalls diverging from a point adjacent the continuous entering end 44g toward and through the head section 34g. As shown best in Fig. 20, the side 86 of the shank 28g opposite the slot 84 is rounded in the manner illustrated, and the opposite flexible side portions of the shank diverge with respect to each other in a direction extending transversely of the slot 84, whereby the anchor member is adapted to be applied to a U-shaped opening 88 in the edge of a work piece 32, as shown in Figs. 21 and 23, or to a generally D-shaped opening 90 in the work piece, as shown in Fig. 24.

From the above description, it is seen that the present invention has provided a novel anchor member having flexible and expandable shank portions with the entering ends of the flexible shank portions retained together by reason of the continuous entering end portion so that the formation of full depth threads throughout the entire length of the anchor member is assured to provide maximum strength for holding a screw member. Furthermore, it is seen that by reason of the continuous entering end portion, the flexible shank portions are retained in desired relationship during application of the anchor member so as to eliminate any possibility of catching an end of a flexible shank portion during such application and breaking the shank portion. The continuous entering end portion of the shank also eliminates free ends or sharp edges of generally similar anchor members heretofore known whereby to eliminate any possibility of a person snagging the shank after it has been applied to the work piece. Furthermore, it is seen that anchor members embodying the principles of this invention contemplate the use of continuous or substantially continuous head sections through which the bore of the anchor member extends to facilitate the application of either standard or tapping screw elements to the anchor member. It will also be seen that while the anchor members of this invention may be provided with a continuous head section, as well as the continuous entering-in portion, the anchor members are formed so that the shank sides have increased resiliency, thereby facilitating easy application of the anchor members to the work piece.

While the preferred embodiments of the present invention have been described and shown herein, it is obvious that many changes may be made in structural details without departing from the spirit and scope of the appended claims.

I claim:

1. A one-piece plastic rivet type fastener including a four-sided shank adapted for axial insertion within a complementary work aperture, and a head extending radially outwardly from one extremity of said shank, said shank being bifurcated by a longitudinal recess which bisects the opposed peripheral sides of the shank so as to present a pair of laterally spaced, transversely yieldable shank sections having opposed longitudinal grooves along their inner surfaces defining axial continuations of a central substantially cylindrical aperture in the head for accommodating a rotary thread-forming screw, the bisected opposed peripheral sides of the shank being sufficiently flat to join adjacent sides of the shank at relatively sharp angles to provide relatively sharp meeting edges whereby to counteract tendency of the fastener to rotate in the work, said shank sections being separated by said longitudinal recess a distance less than the diameter of said central aperture whereby to provide opposed peripheral shank sides of substantial width adjacent said recess, the peripheral surfaces of said shank sections oppositely disposed from each of said longitudinal grooves also having substantial width and tapered at their ends opposite said head to facilitate initial insertion of the shank within a complemental work aperture, shoulders intermediate the head and the entering extremities of said yieldable shank sections cooperating with the head to secure the fastener within the work after the shank has been snapped into position within a work aperture, the peripheral surfaces defined by said opposed sides of each shank section in the vicinity of the head which intersects the shank bifurcation and the other peripheral shank surfaces being cooperatively disposed for engagement with complemental work surfaces which define a work aperture to prevent rotation of the fastener in the work when a thread-forming screw is rotatably applied thereto, said bifurcation presenting a portion extending axially through the head and transversely of the head to an extent sufficient to enhance lateral yieldability of the head, the entering extremities of said shank sections being integrally joined by a transverse shank portion having a screw accommodating aperture defined by a circumferentially continuous axially extending wall.

2. A one-piece plastic rivet type fastener as claimed in claim 1, wherein the portion of the bifurcation extending through the head, completely traverses said head.

3. A one-piece plastic rivet type fastener as claimed in claim 1 wherein the shoulders are reduced in transverse extent by transversely inclined surfaces on the shank sections at opposite sides of the shoulders.

References Cited in the file of this patent

UNITED STATES PATENTS

| Re. 22,618 | Johnson | Mar. 13, 1945 |
| 2,088,955 | Hamill | Aug. 3, 1937 |
| 2,150,080 | Rawlings | Mar. 7, 1939 |
| 2,259,720 | Amesbury | Oct. 21, 1941 |
| 2,393,606 | Brush | Jan. 29, 1946 |
| 2,545,514 | Erb | Mar. 20, 1951 |
| 2,657,894 | Sklenar | Nov. 3, 1953 |
| 2,788,047 | Rapata | Apr. 9, 1957 |

FOREIGN PATENTS

| 556,544 | Great Britain | Oct. 8, 1943 |
| 589,648 | Great Britain | June 26, 1947 |
| 478,514 | Canada | Nov. 13, 1951 |